July 9, 1963    K. BEYERLE    3,097,167
DAMPING BEARING FOR THE SHAFTS OF A GAS CENTRIFUGE
Filed Feb. 20, 1958    9 Sheets—Sheet 3

July 9, 1963   K. BEYERLE   3,097,167
DAMPING BEARING FOR THE SHAFTS OF A GAS CENTRIFUGE
Filed Feb. 20, 1958   9 Sheets-Sheet 6

July 9, 1963        K. BEYERLE        3,097,167
DAMPING BEARING FOR THE SHAFTS OF A GAS CENTRIFUGE
Filed Feb. 20, 1958        9 Sheets-Sheet 8

United States Patent Office 3,097,167
Patented July 9, 1963

3,097,167
DAMPING BEARING FOR THE SHAFTS OF A GAS CENTRIFUGE
Konrad Beyerle, 10 Bonsenstrasse, Gottingen, Germany
Filed Feb. 20, 1958, Ser. No. 716,332
Claims priority, application Germany Feb. 20, 1957
10 Claims. (Cl. 233—23)

The present invention relates to a damping bearing for the shaft of a gas centrifuge.

The rotors of gas centrifuges comprise longitudinal hollow cylinders which are closed up gas-tight by means of covers and the gas mixtures to be subjected to a centrifuge process are fed to the hollow cylinders by means of tubular shafts. Since such rotors formed as drums have a limited precision in their manufacture and in their shape retaining capacity, the free longitudinal axis of the rotor does not coincide exactly with the figure axis. If the rotor would rotate in rigid bearings with high angular velocities usual in gas centrifuges, such arrangement would lead to an undesirable high load for the bearings.

For this reason the rotor is mounted elastically in the same manner as in other fast rotating machines, either by connecting the bearing pins with the rotor by means of an elastic shaft, the bearings for the rotor being rigidly disposed in the machine frame or by having the bearing pins, rigidly connected with the rotor, run in bearings which are movably disposed in the machine frame. In gas centrifuges with a vertical shaft a combination of both types of bearings are preferred. The drum forming the rotor is at first laterally retained elastically by elastic tubular shafts, the upper shaft of which is connected with the runner of the driving motor, while the lower shaft of which is connected with a bearing pin having an axial bore. The bearing pin is mounted in the cover of the housing which may be evacuated and which serves at the same time as the machine frame. The upper tubular shaft transfers the weight of the rotor to a footstep bearing disposed on the runner of the motor.

If the simplifying assumption is made that the longitudinal axis of the drum and the figure axis coincide, it is apparent that as long as the free axis of the drum is disposed in the vertical main axis of the centrifuge, the described bearing results in an operative device. If, however, due to an outer impact a small deviation of the drum axis from the vertical main axis of the centrifuge is experienced, the drum does not return automatically to its vertical position. To the contrary, under certain conditions of operation disturbing moments may be transferred to the drum which has assumed an inclined position, which disturbing moments turn the resulting twist vector still further from the vertical direction.

It is, therefore, one object of the present invention to provide an improved damping bearing for the shafts of a gas centrifuge.

With this and other objects in view which will become apparent in the following detailed description, the present invention will be clearly understood in connection with the accompanying drawings, in which.

Figures 1, 1A:
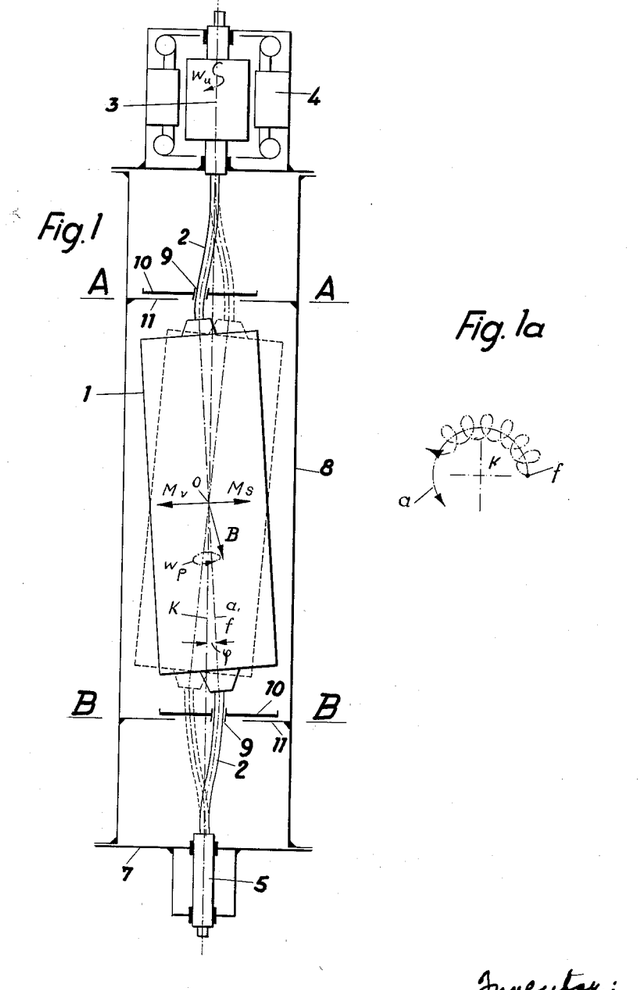
FIGURE 1 is an axial diagrammatic view of a gas centrifuge.
FIG. 1a is a schematic showing of the small circular movements of the figure axis of an elastic captive gyro upon the deviating free longitudinal axis of the drum.

Referring now to the drawings, and in particular to FIGS. 1 and 1a, the drum 1 is retained elastically in lateral direction by means of the elastic tubular shafts 2. The upper one of the tubular shafts 2 is connnected with a rotor 3 of the driving motor 4 and the lower of the tubular shafts 2 is connected with an axially bored bearing pin 5. The latter is mounted in the cover 7 of the housing 8 which may be evacuated and which may serve simultaneously as a machine frame. The upper tubular shaft 2 transfers the weight of the drum 1 to a footstep bearing (not shown) which is disposed on the rotor 3 of the motor 4.

As long as the free longitudinal axis $a$ of the drum 1 coincides with the vertical main axis $k$ of the centrifuge, the described bearing constitutes an operative device. If, on the other hand, a small deviation $\varphi$ of the drum axis $a$ from the vertical main axis $k$ of the centrifuge appears due to an outer impact, as it is assumed in FIG. 1, the drum 1 does not return again by all means into its vertical position. To the contrary, under certain operational conditions the disturbing moments $M_s$ may be transferred upon the drum once in an inclined position, which disturbing moments $M_s$ turn the resulting twist vector B still further from the vertical axis $k$. The twist vector B describes a slowly expanding cone of angular velocity $w_p$ in a direction opposite to that of the turning moment of the drum, the angular velocity $w_p$ being dependent upon the resulting twist B and the stiffness of the shafts 2. The drum 1 has a precession as an elastically captive gyro. Thus the tubular shafts 2 are forced to rotate with curved axles. They are thus subjected to a bending force which changes with the turning frequency of the centrifuge, which bending force may lead to a break due to fatigue. The drum 1 must, therefore, be returned into the vertical main axis $k$ as rapidly as possible and be prevented to abandon the latter appreciably, respectively. In accordance with the mechanical laws of the gyro, an auxiliary moment $M_v$ is required therefor, which over-compensates the disturbing moment $M_s$.

In order to produce this auxiliary moment $M_v$, auxiliary forces are provided adjacent both drum ends, preferably in the positions indicated in FIG. 1 as the planes A—A and B—B, which counteract any deviation of the drum axis from its normal position. It is of no importance how these auxiliary forces are produced.

FIG. 1 discloses the simplest manner to produce such forces. Each of the tubular shafts 2 runs through a ball bearing or slide bearing 9 disposed in the center of a disc 10. Each one of the discs 10 rests laterally movable on a base 11 rigidly secured to the machine frame or housing 8, a defined engaging pressure being produced by a weight or by a spring force (not shown). In such arrangement the drum axis $a$ can move in any direction only upon overcoming the friction force corresponding with the engaging pressure between the disc 10 and the base 11. The stabilizing moment $M_v$, shown in FIG. 1, which is directed against the disturbing moment $M_s$, works on the precessioning drum 1.

The effectiveness of this simple bearing is strongly interfered with and under certain circumstances nearly eliminated, if the drum 1 performs, in addition to the precession considered solely so far, as an elastic captive gyro, still appreciably faster small circular movements (FIG. 1a) of its figure axis $f$ upon the free longitudinal axis $a$ of the drum which deviates slightly therefrom. The discs 10 are then subjected in addition to the precession of the free longitudinal axis $a$ of the drum to a faster cyclic vibration in the horizontal plane due to the deviation of the figure axis $f$ from the longitudinal axis $a$ of the drum, which vibration substantially consumes the friction effect between the discs 10 and their bases 11. Thus, the damping bearing can oppose the slower precession only by a substantially undetermined small portion of the forces which were present without overlapping cyclic vibration. In order to damp still effectively the precession, it is possible to increase the friction forces between the discs 10 and the bases 11 by providing a larger engaging pressure, which result can be obtained only for the price of an increased load on the slide bearing 9 with faster wear and increased power requirements.

Figure 2:
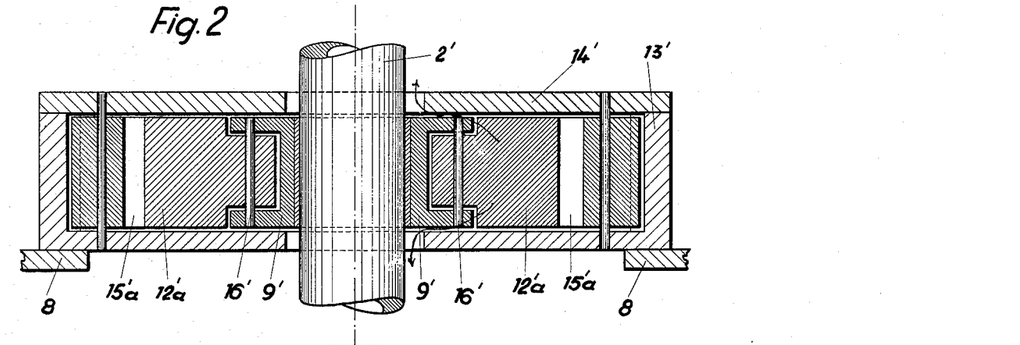
FIGS. 2 and 3 are an axial section and a top plan view, with removed cover plate, respectively, of a known damping bearing.
Figure 3:
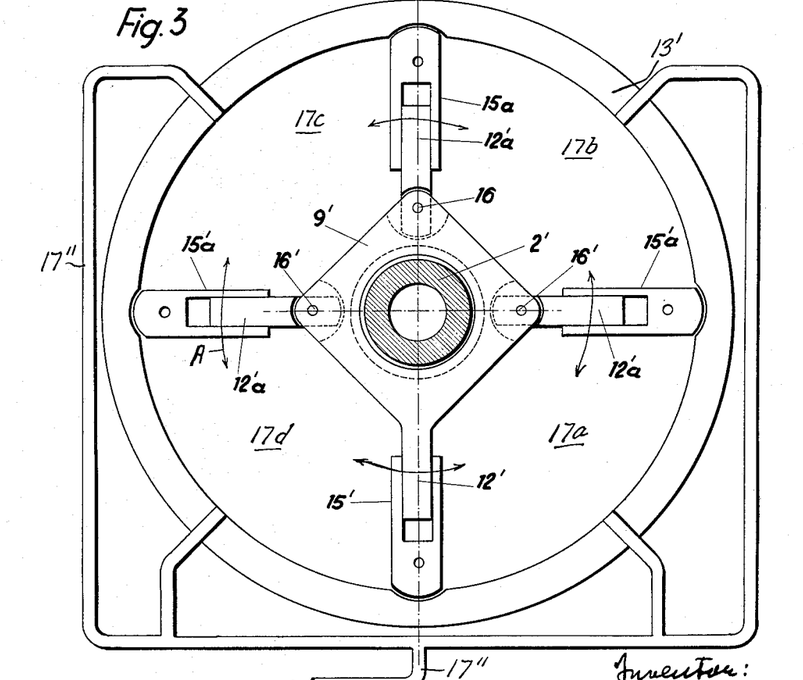

In a more novel, practically tested embodiment of the known damping bearing, as disclosed in FIGS. 2 and 3, the friction between the discs 10 and 11 is replaced by the friction exerted by the flowing oil. The tubular shafts 2′ are mounted in a laterally movable bearing bushing 9′ adjacent the drum 1, the radially extending projection 12′ of which, being rigidly connected with the bearing bushing 9′, slides in a guide member 15′ which is pivotally connected with the immovable housing 13′ and its cover 14′. The bearing bushing 9′ is, thereby, prevented from rotation upon the vertical axis $k$ of the centrifuge, otherwise, however, laterally movable. An arrangement, similar to that of a star motor, is provided according to which further radially extending projections or rods 12′$a$ are pivoted with the bearing bushing 9′ by means of pins 16′ and are slidably mounted in guiding members 15′$a$. The entire structure is disposed in a flat housing 13′ which has a cover 14′ in such a manner that four chambers 17$a$, 17$b$, 17$c$ and 17$d$ are formed, the volume of which changes upon lateral movements of the bearing bushing 9′. The chambers 17$a$, 17$b$, 17$c$ and 17$d$ receive oil by means of conduits 17″. During the lateral movements of the bearing bushing 9′, the oil is moved from one of the chambers 17$a$, 17$b$, 17$c$ and 17$d$ to another of these chambers. In order to achieve this end, the oil conduits 17″, as well as the spaces between the mentioned movable parts and the housing walls (arrows in FIG. 3) are used and, if necessary, connecting channels commensurate with the requirements may be provided. This damping bearing does not lose its resistance against the movement of precession of the drum, if overlapping cyclic vibrations should occur. It does provide, however, an appreciably great resistance against the vibrations due to the low compressibility of the oil. This is connected with a high load on the bearing faces which load increases with the mass of the drum.

The present invention is thus concerned, based on this status of the art, with the damping bearing for the shafts of a gas centrifuge, wherein the effect of damping the precession is not appreciably weakened by the cyclic vibrations of the figure axis of the drum and wherein the additional load on the bearing faces by the mentioned cyclic vibrations is reduced or even avoided entirely in comparison with known structures.

In order to achieve this end, three provisions are made in accordance with the present invention, which may be applied separately or jointly.

The first one of these provisions resides in an arrangement according to which the viscous counterforce, which is proportional to the lateral removal speed of the tubular shaft 2′, is made responsive to the frequency.

Figure 3A:
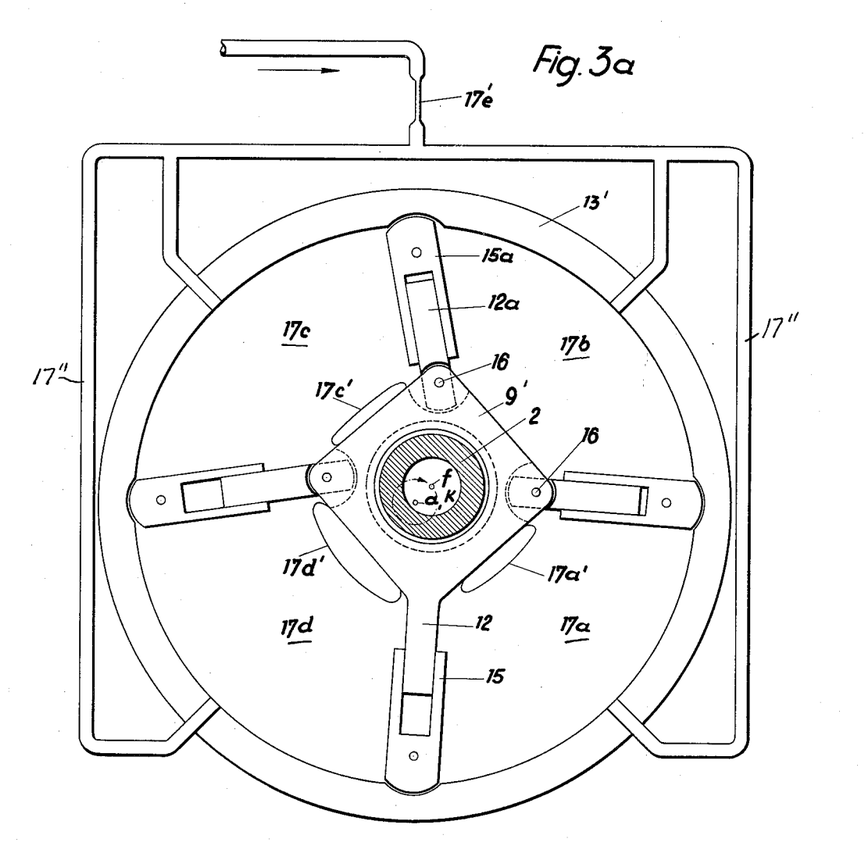
FIG. 3a is an axial section of a damping bearing according to one embodiment of the present invention.

This arrangement may be applied in a simple manner in the damping bearing of known structure, which is disclosed in FIGS. 2 and 3, by throttling the oil feed to the chambers 17$a$, 17$b$, 17$c$ and 17$d$, as indicated in FIG. 3$a$, by provision of a flow resistance 17$e$′ or by limiting the quantity of oil feed. As long as the oil fills completely the chambers 17$a$, 17$b$, 17$c$ and 17$d$ of the bearing bushing 9′, it is therefore subjected to a changing pressure originating from the eccentric position of the mass of the drum 1, which pressure causes the emergence of the oil through the spaces between the bearing bushing 9′ and the walls of the housing 13′, 14′ with increased force (arrows in FIG. 2) This increase of oil consumption which is not covered by the throttled or fixedly set feed is maintained until small hollow spaces or bubbles are formed around the bearing bushing 9′, which are formed and which disappear in accordance with the rhythm of the cyclic vibration and which reduce the pressure transfer to the oil, until an equilibrium is obtained between the oil stream fed to the bearing and the oil stream emerging therefrom. In FIG. 3$a$ this process is schematically shown. The point $f$ of the figure axis of the drum 1 turns upon the free longitudinal axis $a$ of the drum and the vertical main axis $k$ of the centrifuge, respectively, as is indicated by the small circle having an arrow. The amount of the eccentric position of the mass of the drum 1 determines the diameter of said circle and, thereby, also the amplitude of the lateral oscillations of the bearing bushing 9′ and the maximum volume of the hollow spaces or bubbles 17$a$′, 17$c$′ and 17$d$′. The drawing shows that phase of the process where the chamber 17$b$ has its smallest and the chamber 17$d$ has its largest volume. The chambers 17$a$ and 17$c$ have just reached their median volume and the forming hollow spaces 17$a$′ and 17$c$′ have accordingly their median size. The oil free hollow space has just disappeared in the chamber 17$b$, while it is expanded to its maximum in the chamber 17$d$. The eccentric mass vibration of the drum 1 can now take place without any oil removal in the damping bearing. The oil exerts only small counterforces. Nevertheless, it provides the resistance required for the damping of the precession which presents itself as a superimposed slow movement of the bearing body 9′, since now a real removal of oil from one chamber into the other takes place. The viscous forces of the bearing caused by the oil, increase at first with the velocity amplitude, if A constitutes the amplitude of the stroke and $\omega$ is the angular velocity of the cyclic vibration. This proportionality is, however, interrupted with the start of the above described formation of the hollow spaces. The viscous force approaches from now on a limit value asymptotically, which depends in the first place upon the forcibly fed oil stream. In this manner it is possible to produce frequency-dependent damping forces also with oil soaked packings of porous yielding material, which are maintained under a predetermined, all around outer pressure. Such packings require a certain time with each sudden discharge, in order to expand by means of sucking up oil. This time is, however, not available with said fast vibrations, so that a formation of a hollow space is brought about with corresponding discharge of the bearing faces, as demonstrated in FIG. 3$a$.

The second provision resides in an arrangement wherein an additional elastic member is provided, as shown schematically in FIGS. 4$a$, 4$b$, 4$c$, 4$d$, 4$e$, 4$f$, in the connection between the bearing $9^2$ and the frame $8^2$, which connection resides only in the known embodiment shown in FIGS. 2 and 3 of the oil filled damping chambers 17$a$, 17$b$, 17$c$, 17$d$ of changing volume. FIGS. 4$a$ to 4$f$ disclose schematic showings of the elements participating in the cyclic oscillation of the drum axis $a$ on an immovable vertical plane at which schematic showings the prevailing conditions may be ascertained more easily. Referring still to FIGS. 4$a$ to 4$f$, the centrifuge drum $1^2$ is connected by the elastic tubular shafts $2^2$, one of which is shown only and mounted in the bearing $9^2$, while $8^2$ is the frame, and 18$a$, 18$b$, 18$c$, 18$d$, 18$e$, and 18$f$ are additional elastic elements, in accordance with the present invention. The piston $19^2$ reciprocating in the cylinder 20 is the equivalent of the oil chamber arrangement, that means, of the parts 9′, 12′, 15′, 12′$a$ and 15′$a$ in FIG. 3. An overflow channel having a valve $21^2$ is provided for the control of the viscous counterforce during the movements of the piston $19^2$ in the cylinder 20 and corresponds to the channels 17″ and the chambers for the flow in the direction of the arrows A in FIG. 3.

It is of no importance for the later explained operation, at what point of the mechanical series arrangement the elastic member 18a, 18b, 18c or 18d is inserted. The embodiment shown in FIG. 4b is distinguished over that shown in FIG. 4a merely by the feature that the elastic member 18b is disposed between the drum $1^2$ and the bearing bushing $9^2$ and in particular in the form of an additional elasticity of that portion of the tubular shaft $2^2$ disposed between the drum $1^2$ and the bearing bushing $9^2$. In accordance with the embodiment disclosed in FIG. 4c, the elastic member may be produced in such a manner, that the damping cylinder 20 in an embodiment according to FIG. 3 is filled with oil containing gas bubbles 18c. The elastic member may be also disposed between the bearing bushing $9^2$ and the frame $8^2$ in such a manner that it exerts simultaneously a centering force upon the drum $1^2$, as is shown in the embodiment of an elastic membrane 18d in FIG. 4d. This membrane 18d, which takes the place of the piston $19^2$, may be deformed with faster vibrations as shown in FIG. 4e, without causing an appreciable movement of oil through the throttle $21^2$. The membrane 18d exerts simultaneously the mentioned centering force upon the drum $1^2$. Finally the walls 18f of the oil chamber 20 may be elastic, as shown in FIG. 4f by the elastic membranes 18f.

Figure 4A:
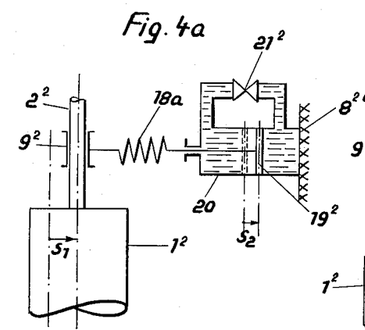
FIGS. 4a to 4f are schematic showings demonstrating the principle of one embodiment of damping bearings.
Figure 4B:
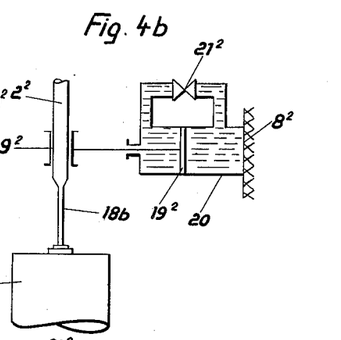
Figure 4C:
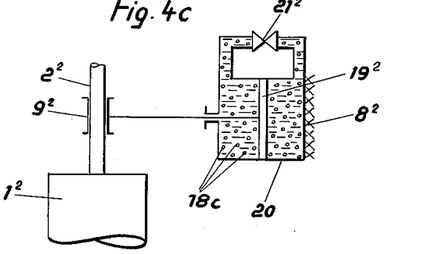

In FIG. 4a is shown the lateral displacement $s_1$ of the figure axis of the drum $1^2$ and the lateral displacement $s^2$ of the piston $19^2$ from its respective positions. The same distinction is to be made in all other embodiments.

The timely run of $s_1$ is to be considered as given and consists generally of a superposition of two harmonious oscillations, namely the mass vibration and the precession of the drum.

Figure 4D:
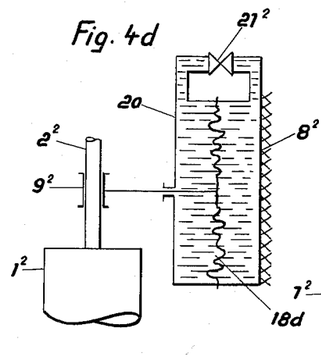
Figure 4E:
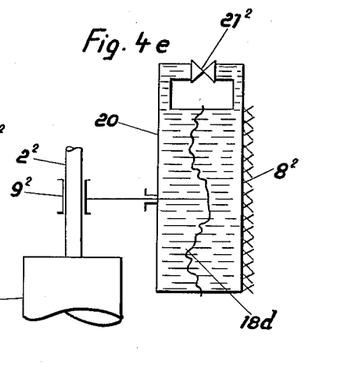
Figures 4F, 5:
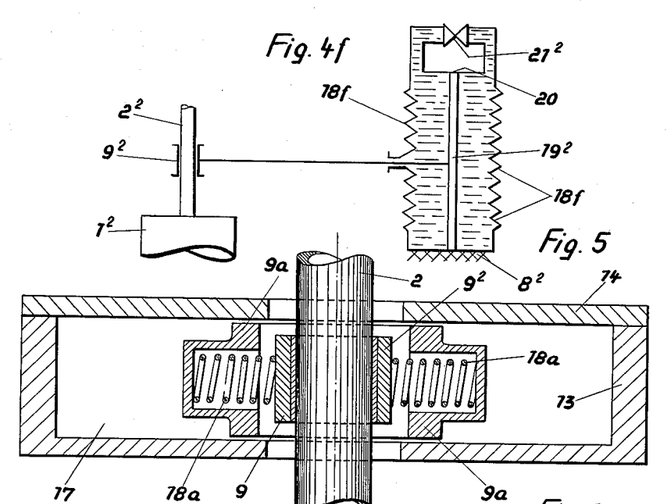
FIGS. 5 to 12 are axial sections and top plan views, respectively, of different embodiments of a damping bearing for gas centrifuges in accordance with the present invention.

Upon proper adjustment of the elastic elements 18a to 18f and of the overflow valve $21^2$, it can be achieved that fast mass vibrations are taken up essentially by the elastic elements whereas slower precession movements are taken up essentially by a movement of the piston $19^2$ or by an oil displacing deformation of a membrane 18d in the oil filled damping cylinder 20 whereby an effective damping is achieved. It is to be taken into consideration, however, that the constants of the arrangement may be always approximately correctly set only for a predetermined range of the number of revolutions. In order to bring about safe oscillation dampings at any number of revolutions, it is possible by adjustment of the overflow valve $21^2$ on the damping cylinder 20 to qualify the device to dampen effectively also a faster precession of the drum $1^2$ at a smaller number of revolutions, for instance, at the start.

Figure 6:
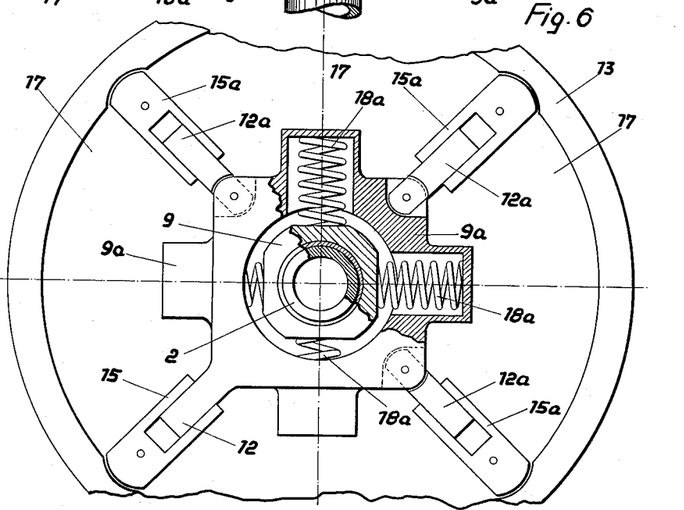
Figure 7:
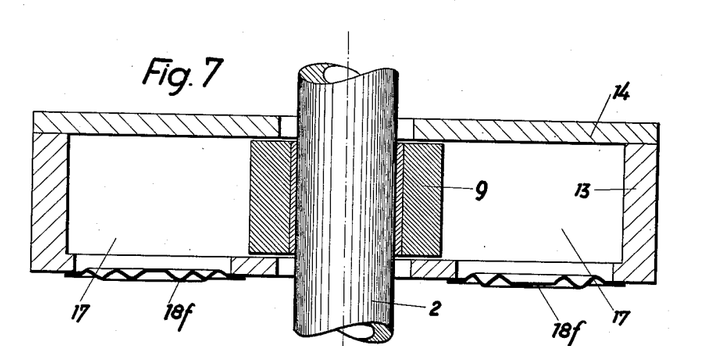
Figure 8:
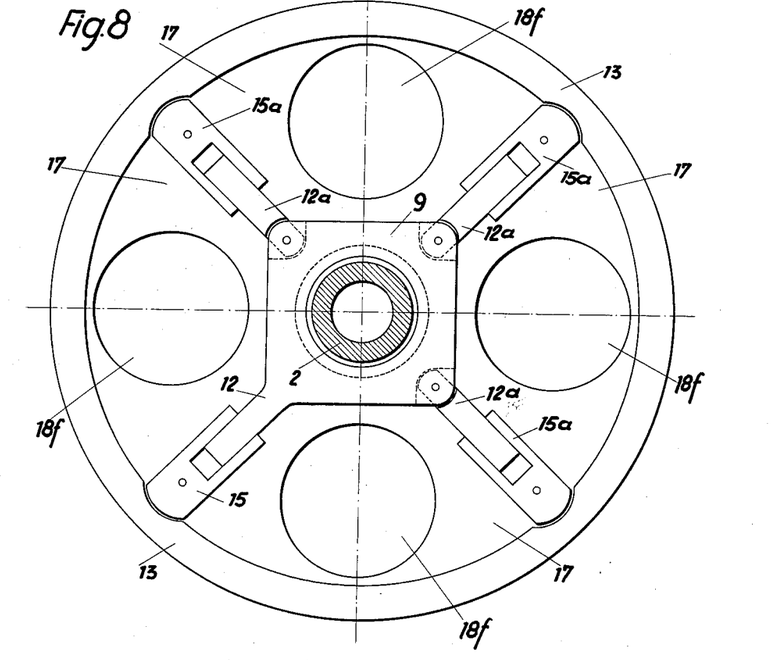
Figure 9:
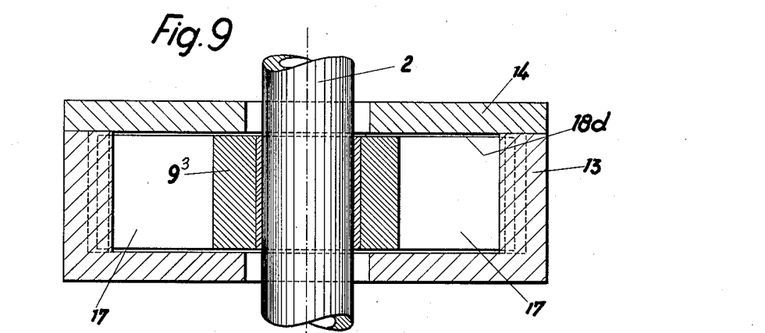
Figure 10:
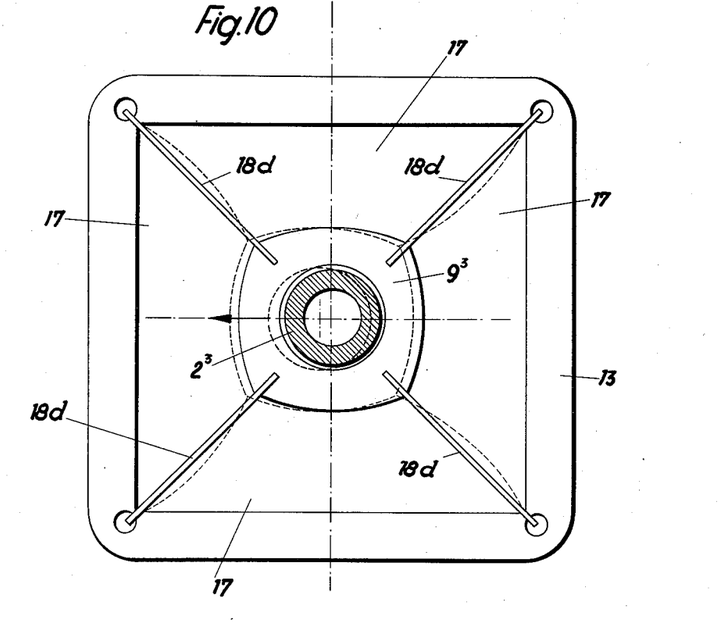

Referring now to FIGS. 5 to 10 of the drawings, which disclose further practical embodiments of damping bearings in accordance with the previously described schematic arrangements, FIGS. 5 and 6 show another embodiment of a damping bearing. FIGS. 7 and 8 disclose a damping bearing in accordance with the scheme shown in Fig. 4f. FIGS. 9 and 10 disclose a damping bearing in accordance with the scheme shown in FIGS. 4d and 4e. The latter embodiment results from FIGS. 2 and 3 in a simple manner, by providing elastic slides 18d of spring steel instead of the rigid elements 12', 15' and 12'a, 15'a in FIGS. 2 and 3. Since the elastic slides 18d are rigidly clamped in the bearing bushing $9^3$, this damping bearing exerts also a centering force upon the drum 1, and thus operates like stiffening means on the elastic drum shafts $2^3$. On the other hand, they may be bent through with fast vibrations, so that no oil displacement is necessary from one chamber to the other chamber, as indicated in dotted lines in FIG. 10.

The third provision resides in the feature according to which the sliding faces of the damping bearing which rotate with the drum, are laterally adjustable towards the drum, in order to permit self-adjustment of the running faces into the free rotating axis of the drum 1. By this expedient a complete release of the sliding faces of the bearing from any load by vibrations is brought about.

Figure 11:
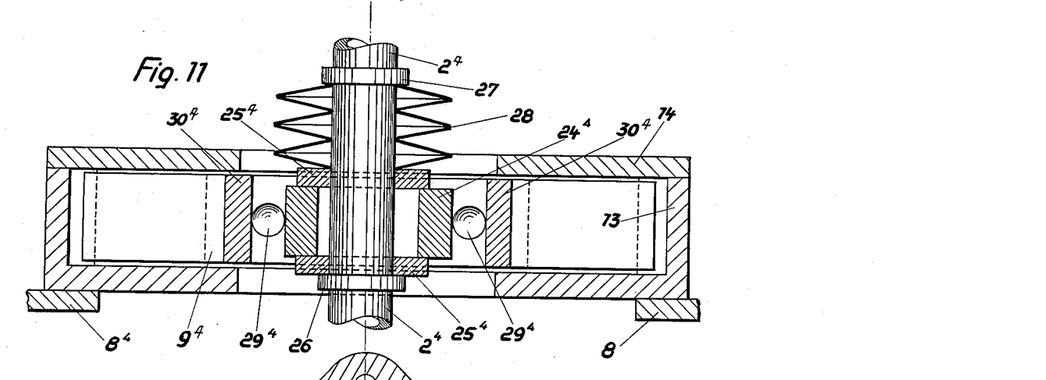
Figures 12, 13:
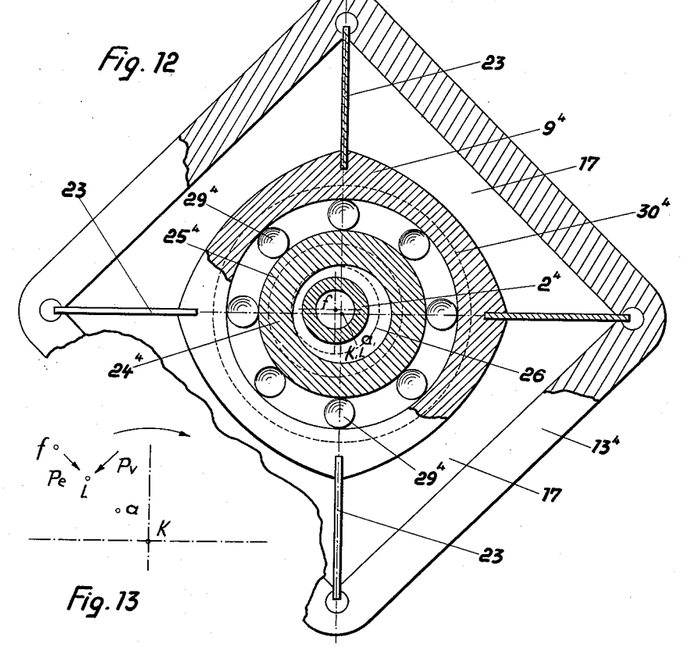

On possibility of a practical application of this concept is disclosed in FIGS. 11 and 12. There the tubular shaft $2^4$ is not used directly as a bearing pin equipped with a ball bearing inner ring which is mounted with free play, but rather projects with certain play through an inner ring $24^4$ of a ball bearing, and is connected with the inner ring of the ball bearing by means of a friction coupling, which permits lateral movements if a certain force is applied. Instead of using a ball bearing it is also possible to provide a sliding bearing (not shown). Above a certain critical number of revolutions, the forces of the masses operate in the direction of a displacement of the hollow pin of the slide bearing or the inner ring of the ball bearing (not shown) into the free axis of the drum 1 by overcoming the resistance of the movement of the mentioned friction coupling. This amounts to a complete release of the damping bearing of any wear of its parts by vibrations of the mass of the drum 1.

The tubular shaft $2^4$ (FIG. 11) is surrounded by the inner ring $24^4$ of a ball bearing providing radial play, which play is slightly greater than the optimum balancing deviation of the free longitudinal axis $a$ of the drum from the figure axis $f$. Discs $25^4$, which are biased by a pressure spring (spring bellows 28), and slidable on the tubular shaft $2^4$, retain the inner ring $24^4$ of the ball bearing with a predetermined previously adjusted force in its present position towards the tubular shaft $2^4$, the ball bearing having balls $29^4$ and an outer ring $30^4$. The latter is radially movable in the inner space of the damping bearing $9^4$. If the lateral forces, which have been transferred from the ball bearing to the tubular shaft $2^4$ and the centrifuge drum 1, respectively, surmount the friction force present between the inner ring $24^4$ and the discs $25^4$, a corresponding movement of the inner ring $24^4$ towards the figure axis $f$ of the drum 1 takes place.

Figure 14:
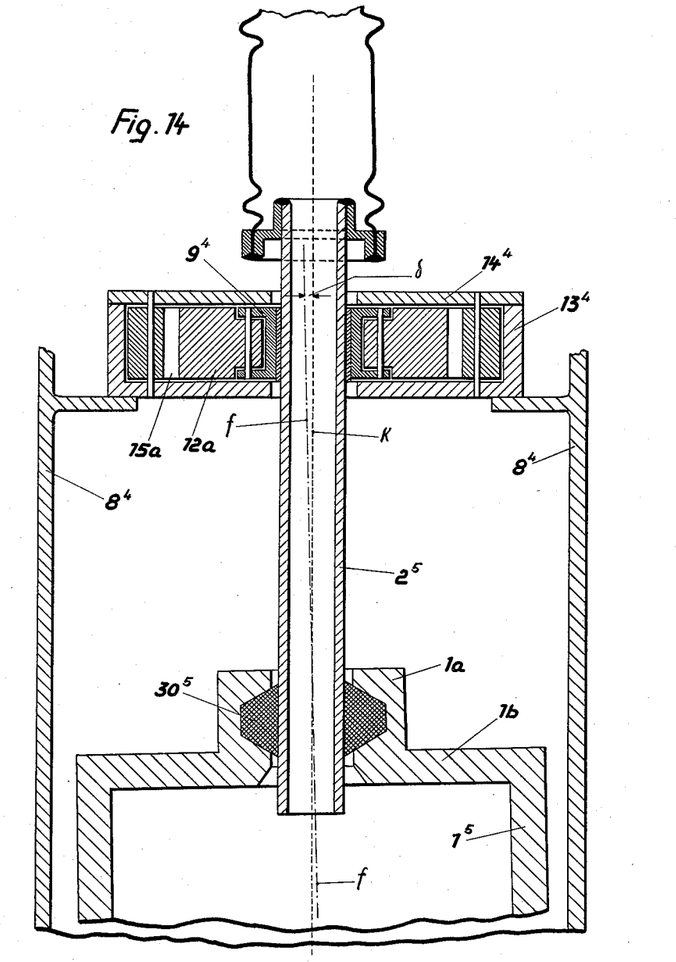

Another possibility for providing a lateral displacement of the rotating sliding face of the bearing towards the figure axis $f$ of the drum 1 is disclosed in FIG. 14. The lateral displacement is here achieved in such a manner, that the part of the possibly multi-part tubular shaft $2^5$ which is disposed adjacent the drum cover 1b is pivotally secured to the drum cover 1b for swinging about a small angle $\delta$.

In accordance with the present invention the prevailing position of said part of the tubular shaft $2^5$ is maintained with a certain force in such a manner, that clamping means, as plastic material or construction elements having inner friction are interposed between the rotor and the tubular shaft, which clamping means secure the tubular shaft relative to the axis of the rotor.

The present invention is disclosed schematically in FIG. 14 by interposition of a plastic packing between the rotor cover and the tubular shaft.

The tubular shaft may be made of several parts, whereby the portions connected with the cover 1b of the rotor are mounted for swinging for a small angle $\delta$.

FIG. 14 shows in cross section the upper end of a rotor $1^5$ formed as a drum with the portion of a tubular shaft $2^5$ attached thereto.

The drum has the figure axis $f$, while the axis, indicated as $k$, is the axis upon which the swingable part of the tubular shaft $2^5$ moves towards the figure axis $f$ for the small angle $\delta$.

The drum $1^5$ is closed by the cover 1b with the hub 1a, a plastic material $30^5$ being interposed between the ends of the tubular shaft $2^5$ and the hub 1a and the cover 1b, respectively, which plastic material $30^5$ permits of swinging of the tubular shaft $2^5$ over an angle $\delta$. The securing of this position relative to the figure axis $f$ of the drum is brought about by the plastic material $30^5$. This may be replaced by conventional construction elements frictionally engaging each other.

For an explanation of the operation, FIG. 13 discloses the projecting points of the different axes to be distinguished in an examination of the dynamics of the eccentrically massed drum, the axes assuming such relative positions above a critical number of revolutions given by the elasticity of the bearing and the inertia moments of the drum. It is assumed hereby, that the drum 1 has an appreciable eccentricity but does not precede. $k$ is the vertical main axis of the centrifuge, $a$ the free longitudinal axis of the drum, $l$ is the axis of the running faces of the pin, i.e. either of the inner ring $24^4$ of the ball bearing (FIG. 11) or the running face of the tubular shaft $2^5$ at the level of the damping bearing (FIG. 14), and $f$ is the figure axis of the drum. The force $P_e$ is transferred from the elastic parts of the damping bearing onto the running face of the pin of the damping bearing. The viscous forces would have the direction of the vector $P_v$. While the viscous forces are overcome by a rotary moment derived from a motor, the elastic forces $P_e$ operate a displacement of the running face of the pin in a direction towards achieving the concentric position to the free longitudinal axis of the drum. The distances $k–a$ and $k–l$ assume a fixed proportion relative to each other, the former determining the rotary moment required for the rotation of the twist vector with the number of revolutions for operation and the latter the rotary moment available therefor. Each reduction of the distance $a–l$ brings about forcibly a corresponding reduction of the distances $k–a$ and $k–l$. This process terminates in such a manner that the points $a$ and $l$ coincide practically in $k$, while $f$ describes a circle around $a, k, l$ of a radius corresponding with the eccentricity of the drum as it was assumed in the embodiment shown in FIG. 12. The running face of the damping bearing is freed from any additional load caused by the eccentricity of the drum upon reaching this operational state.

While I have disclosed several embodiments of the present invention, it is to be understood that these embodiments are given by example only and not in a limiting sense, the scope of the present invention being determined by the objects and the claims.

I claim:

1. In a gas centrifuge, a rotor, means for damping said rotor against precession movements superimposed by relatively faster vibrations of said rotor, a frame supporting said rotor, a hollow shaft disposed at and connected to each end face of said rotor, said means for damping including a bearing for each of said shafts, a closed housing filled with liquid for each of said bearings, a plurality of substantially radially disposed deformable members in said housing, the outer ends of said members being disposed in said housing and the inner ends of said members carrying said bearing substantially at the center of said housing, said deformable members permitting movement of said bearing in a plane disposed perpendicularly to the longitudinal axis of said shaft, said substantially radially disposed members defining with the inner face of said housing a plurality of liquid containing chambers, and conduits communicating between each pair of adjacent chambers for a flow of said liquid between said chambers during said precession movements of said rotor and damping said movements of the latter, throttled liquid feeding means connected to said chambers for feeding liquid to said chambers to replace liquid removed from said chambers by vibrations originating from the eccentricity of said rotor, said throttled feeding means feeding said liquid at such a slow rate that hollow spaces are created and extinguished, respectively, in said chambers according to the rhythm of said vibrations.

2. In a gas centrifuge, a rotor, means for damping said rotor against precession movements superimposed by relatively faster vibrations of said rotor, a frame supporting said rotor, a hollow shaft disposed at and connected to each end face of said rotor and feeding gases to be centrifuged to said rotor, said means for damping including a bearing for each of said shafts, a closed housing filled with liquid for each of said bearings, a plurality of substantially radially disposed deformable members in said housing, the outer ends of said members being disposed in said housing and the inner ends of said members carrying said bearing substantially at the center of said housing, said deformable members movably supporting said bearing in a plane disposed perpendicularly to the longitudinal axis of said shaft, said substantially radially disposed members defining with the inner face of said housing a plurality of liquid containing chambers, and conduits communicating between each pair of adjacent chambers for a flow of said liquid between said chambers during said precession movements of said rotor and damping said movements of the latter, and an elastic member disposed in series with said chambers between each of the end faces of said rotor and said frame, to assume the fast vibration of said rotor.

3. The gas centrifuge, as set forth in claim 2, wherein said elastic members comprise said hollow shafts.

4. The gas centrifuge, as set forth in claim 2, wherein said elastic member comprises air bubbles disposed in said liquid.

5. The gas centrifuge, as set forth in claim 2, which includes friction means disposed between said shaft and said bearing and permitting a movement of said shaft perpendicularly to the longitudinal axis of said shaft by overcoming said friction means.

6. The gas centrifuge, as set forth in claim 2, wherein said liquid containing chambers have at least one elastic wall.

7. The gas centrifuge, as set forth in claim 2, wherein said deformable members comprise elastic slides secured to a bushing of said bearing at one of their ends and inserted for longitudinal movement in said housing at the other of their ends, so that they exert a centering force.

8. The gas centrifuge, as set forth in claim 5, which includes means for swingable mounting of said hollow shafts in order to achieve the displacement of the running faces of said hollow shafts of said rotor towards the axis of said rotor.

9. The gas centrifuge, as set forth in claim 5, which includes clamping means disposed between said rotor and said hollow shafts and the hubs of said rotor, respectively, said clamping means holding yieldingly said hollow shafts and said hubs, respectively, at their position relative to the axis of said rotor.

10. The gas centrifuge, as set forth in claim 5, wherein said hollow shafts comprise a plurality of parts, means connecting said parts such that said hollow shafts are swingable up to a preedtermined small angle relative to the axis of said rotor.

References Cited in the file of this patent

UNITED STATES PATENTS

| | | |
|---|---|---|
| 672,494 | Robertson et al. | Apr. 23, 1901 |
| 1,174,955 | Balzer | Mar. 14, 1916 |
| 2,277,923 | Morgenstern | Mar. 31, 1942 |
| 2,557,542 | Kapitza | June 19, 1951 |
| 2,913,169 | Wilsmann | Nov. 17, 1959 |